(12) United States Patent
Kim et al.

(10) Patent No.: US 11,394,243 B2
(45) Date of Patent: Jul. 19, 2022

(54) DETACHABLE SEAT WIRELESS POWER TRANSFER AND COMMUNICATION SYSTEM (71) Applicants: HYUNDAI MOTOR COMPANY, Seoul (KR); KIA MOTORS CORPORATION, Seoul (KR); DAE WON SAN UP CO., LTD., Ansan-si (KR); AMOSENSE Co., Ltd., Cheonan-si (KR)

(72) Inventors: Tae Su Kim, Gunpo-si (KR); Bo Hyeon Han, Seoul (KR); Dong Hwi Kim, Ansan-si (KR); Won San Na, Seoul (KR); Jae Myung Hur, Seoul (KR); Jong Ho Lim, Siheung-si (KR)

(73) Assignees: Hyundai Motor Company, Seoul (KR); Kia Motors Corporation, Seoul (KR); Dae Won San Up Co., Ltd., Ansan-si (KR); Amosense Co., Ltd., Cheonan-si (KR)

(*) Notice: Subject to any disclaimer, the term of this patent is extended or adjusted under 35 U.S.C. 154(b) by 0 days.

(21) Appl. No.: 17/036,689

(22) Filed: Sep. 29, 2020

(65) Prior Publication Data
US 2021/0234404 A1 Jul. 29, 2021

(30) Foreign Application Priority Data
Jan. 29, 2020 (KR) .......................... 10-2020-0010195

(51) Int. Cl.
*H02J 50/00* (2016.01)
*H02J 50/12* (2016.01)
(Continued)

(52) U.S. Cl.
CPC ............ *H02J 50/12* (2016.02); *B60L 53/126* (2019.02); *B60N 2/0296* (2013.01); *B60N 2/919* (2018.02);
(Continued)

(58) Field of Classification Search
CPC .... B60N 2/0296; B60N 2/919; B60R 16/023; H02J 50/00; H04B 5/00
See application file for complete search history.

(56) References Cited

U.S. PATENT DOCUMENTS

| 6,234,574 B1 * | 5/2001 | Hoshihara | ......... B60N 2/01583 297/336 |
| 2003/0197411 A1 * | 10/2003 | Jeong | ................. B60N 2/01583 297/378.13 |

(Continued)

FOREIGN PATENT DOCUMENTS

KR 10-2019-0107893 A 9/2019

*Primary Examiner* — Adi Amrany
(74) *Attorney, Agent, or Firm* — Morgan, Lewis & Bockius LLP (57) ABSTRACT A detachable seat wireless power transfer and communication system includes: a seat assembly including a seat receiver configured to receive power wirelessly and a seat controller to control the seat receiver; a vehicle assembly spaced apart from the seat assembly at a lower end of the seat assembly; a front hook spaced apart from the seat assembly at a lower end of a front portion of the seat assembly in a length direction to fix a first end of the seat assembly to a vehicle body; a rear latch spaced apart from the seat assembly at a lower end of a rear portion of the seat assembly in the length direction to fix a second end of the seat assembly to the vehicle body; and a front hook switch spaced apart from the vehicle assembly. The vehicle assembly includes a vehicle transmitter configured to wirelessly
(Continued)

transmit the power to the seat assembly, and a vehicle controller configured to control the vehicle transmitter.

9 Claims, 4 Drawing Sheets (51) Int. Cl.
*H04B 5/00* (2006.01)
*B60L 53/126* (2019.01)
*H02J 50/80* (2016.01)
*B60N 2/90* (2018.01)
*H02J 50/10* (2016.01)
*B60N 2/02* (2006.01)

(52) U.S. Cl.
CPC .............. *H02J 50/10* (2016.02); *H02J 50/80* (2016.02); *H04B 5/0037* (2013.01)

(56) References Cited

U.S. PATENT DOCUMENTS

| | | | | |
|---|---|---|---|---|
| 2007/0132265 | A1* | 6/2007 | Tsukamoto | B60N 2/0155 |
| | | | | 296/65.03 |
| 2015/0061578 | A1* | 3/2015 | Keeling | H02J 50/90 |
| | | | | 320/108 |
| 2016/0126747 | A1* | 5/2016 | Kato | H02J 7/00304 |
| | | | | 307/104 |
| 2017/0346330 | A1* | 11/2017 | Matsuno | H02J 7/027 |
| 2018/0309314 | A1* | 10/2018 | White, II | H02J 50/40 |
| 2018/0337556 | A1* | 11/2018 | Yun | B60R 16/027 |
| 2020/0269725 | A1* | 8/2020 | Williams | B60N 2/919 |
| 2020/0290534 | A1* | 9/2020 | Hemmelgarn | B60N 2/18 |
| 2021/0050882 | A1* | 2/2021 | Jia | H02J 50/80 |

* cited by examiner

DETACHABLE SEAT WIRELESS POWER TRANSFER AND COMMUNICATION SYSTEM

CROSS-REFERENCE TO RELATED APPLICATION

This application claims the benefit of priority to Korean Patent Application No. 10-2020-0010195 filed on Jan. 29, 2020 in the Korean Intellectual Property Office, the entire contents of which are incorporated herein by reference.

TECHNICAL FIELD

The present disclosure relates to a detachable seat wireless power transfer and communication system. More particularly, the present disclosure relates to a detachable seat wireless power transfer and communication system in which a seat controller is provided in a detachable seat separately from a controller of a vehicle so as to perform wireless communication therebetween, and a vehicle transmitter and a seat receiver are provided so as to perform wireless power transfer without connectors.

BACKGROUND

In general, a seat of a vehicle has various convenience functions so as to provide convenience to a passenger.

These convenience functions include a heating function to adjust the temperature of the seat in cold weather, a reclining function to adjust the angle of a seat back relative to a seat cushion, a foot-rest function provided in the vehicle so as to improve convenience of a rear seat passenger, etc. In the case of the heating function, heating wires, i.e., conducting wires which generate heat using current, are installed in the seat of the vehicle, and may thus warm a passenger in the vehicle and reduce the air-conditioning load of the vehicle.

If a vehicle seat moving forwards and backwards is installed in a first row or a second row in a vehicle, electric wires are installed to have a short length. However, if the vehicle seat moving forwards and backwards is installed in a third row or the like in the vehicle, electric wires which move a long distance and thus provide power to heating wires of the vehicle seat are installed to have a long length, and thus, the electric wires may be twisted and power transfer to the heating wires of the vehicle seat may be deteriorated.

As methods for solving problems caused by connection of electric wires, wireless power transfer technologies are receiving great attention now.

Wireless power transfer (or wireless power transmission) technologies wirelessly transfer electrical energy from a transmitter to a receiver using induction of an electromagnetic field. Here, electric motors or transformers using electromagnetic induction have been used, and methods for transferring electrical energy by emitting electromagnetic waves, such as high-frequency waves, microwaves, laser, etc., have been attempted.

Up to now, wireless energy transfer methods may be roughly classified into an electromagnetic induction method, an electromagnetic resonance method, and an RF transfer method using a short-wavelength wireless frequency.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a detachable seat wireless power transfer and communication system in which a seat controller is provided in a detachable seat separately from a controller of a vehicle so as to perform wireless communication therebetween.

It is another object of the present disclosure to provide a detachable seat wireless power transfer and communication system to which a detachable seat is applied and in which a vehicle transmitter and a seat receiver are provided so as to perform wireless power transfer without connectors.

In one aspect, the present disclosure provides a detachable seat wireless power transfer and communication system including: a seat assembly including a seat receiver configured to receive power wirelessly and a seat controller configured to control the seat receiver, a vehicle assembly spaced apart from the seat assembly at a lower end of the seat assembly, a front hook spaced apart from the seat assembly at a lower end of a front portion of the seat assembly in a length direction and configured to fix a first end of the seat assembly to a vehicle body, a rear latch spaced apart from the seat assembly at a lower end of a rear portion of the seat assembly in the length direction and configured to fix a second end of the seat assembly to the vehicle body, and a front hook switch spaced apart from the vehicle assembly and disposed to correspond to the front hook, wherein the vehicle assembly includes a vehicle transmitter configured to transmit the power wirelessly to the seat assembly and a vehicle controller configured to control the vehicle transmitter.

When one end of the front hook contacts the front hook switch, the seat controller and the vehicle controller may mutually transmit and receive seat information and vehicle information with each other through wireless communication.

The seat information may include a seat mounted state, whether or not a passenger sits on a seat, or whether or not the passenger fastens a safety belt, and the vehicle information may include a starting state of a vehicle or a vehicle speed.

The detachable seat wireless power transfer and communication system may further include a rear latch engagement part located at the vehicle assembly so as to correspond to the rear latch, and rear latch switches located inside the rear latch.

When the rear latch contacts the rear latch engagement part, the vehicle transmitter may apply the wireless power to the seat receiver.

When a current value of the vehicle assembly exceeds a predetermined reference value, the vehicle transmitter may stop supplying the wireless power, and when a voltage value of the seat assembly is less than a predetermined reference value in a state in which the vehicle transmitter applies the wireless power so as to turn on an electronic unit, the seat controller may transmit information to the vehicle controller through wireless communication and the vehicle transmitter may stop supplying the wireless power.

The wireless power may be supplied to the electronic unit mounted on a seat.

The electronic unit may include at least one selected from the group consisting of a heater, a ventilation seat, a headrest, a lumbar support and a cushion extension.

The wireless communication may use at least one communication network selected from the group consisting of Ethernet, Wireless Fidelity (Wi-Fi), Wireless Broadband (WiBro), World Interoperability for Microwave Access (WiMax), High Speed Downlink Packet Access (HSDPA), ZigBee, Bluetooth, Ultra-wideband (UWB), Infrared Data Association (IrDA), Shared Wireless Access Protocol (SWAP), Long Term Evolution (LTE), Cellular IoT, Low Power Wide Area (LPWA), NarrowBand-Internet of Things (IoT) and Long Range (LoRa).

The wireless power may be applied based on an electromagnetic induction method or an electromagnetic resonance method.

Other aspects and exemplary embodiments are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawings.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the invention as defined by the appended claims.

Further, in the following description of the embodiments, it will be understood that each of suffixes "part", "assembly", etc. indicates a unit for processing at least one function or operation, which may be implemented using hardware, software, or a combination of hardware and software.

Figure 1:
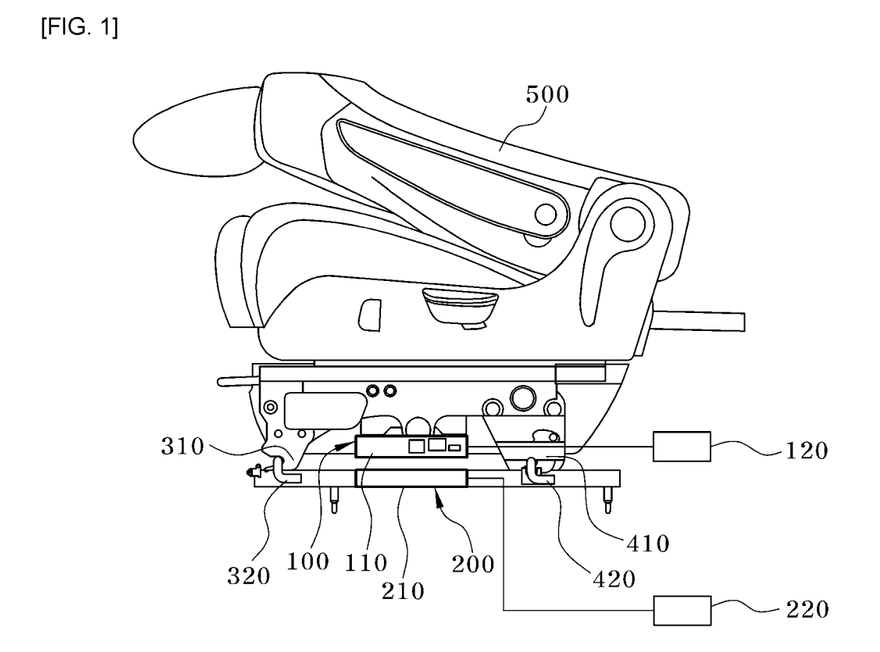
FIG. 1 is a view illustrating the configuration of a detachable seat wireless power transfer and communication system according to one embodiment of the present disclosure.

FIG. 1 is a view illustrating the configuration of a detachable seat wireless power transfer and communication system according to one embodiment of the present disclosure.

Referring to FIG. 1, a detachable seat wireless power transfer and communication system according to one embodiment of the present disclosure may include a seat assembly 100 including a seat receiver 110 configured to receive wireless power and a seat controller 120 configured to control the seat receiver 110, a vehicle assembly 200 located at a lower end of the seat assembly 100, a front hook 310 located at a lower end of a front portion of the seat assembly 100 in the length direction and configured to fix one end of the seat assembly 100 to a vehicle body, a rear latch 410 located at the lower end of the rear portion of the seat assembly 100 in the length direction and configured to fix the other end of the seat assembly 100 to the vehicle body, and a front hook switch 330 located at the vehicle assembly 200 so as to correspond to the front hook 310, and the vehicle assembly 200 may include a vehicle transmitter 210 configured to transmit the wireless power to the seat assembly 100 and a vehicle controller 220 configured to control the vehicle transmitter 210.

The seat assembly 100 may include the seat receiver 110 configured to receive wireless power, and the seat controller 120 configured to control the seat receiver 110. The seat assembly 100 may be located at the lower end of a detachable seat.

The seat receiver 110 may be configured to receive wireless power. More particularly, the seat receiver 110 may include a reception coil, a rectifier, and a sensing unit.

As a method for receiving wireless power by the seat receiver 110, AC power received by the reception coil may be transmitted to the rectifier. The rectifier may convert the AC power into DC power. The sensing unit may measure the intensity of the DC power output from the rectifier and transmit the measured intensity to the seat controller 120. Further, the sensing unit may measure the intensity of current applied to the reception coil depending on reception of the wireless power, and transmit a measurement result to the seat controller 120. In addition, the sensing unit may measure the internal temperature of the seat receiver 110, and provide the measured internal temperature to the seat controller 120.

The seat controller 120 may be configured to control the seat receiver 110. For example, the seat controller 120 may determine whether or not overvoltage occurs by comparing the measured intensity of the DC power output from the rectifier with a predetermined reference value. As a determination result, if overvoltage occurs, the seat controller 120 may provide information about overvoltage occurrence to the vehicle controller 220 so that the vehicle transmitter 210 stops transmitting wireless power.

Further, the seat controller 120 may be configured to determine that a sensing signal is received when the intensity of the DC power output from the rectifier is the predetermined reference value or more, and to provide information about the sensing signal to the vehicle controller 220 so that the vehicle transmitter 210 stops transmitting wireless power, when the sensing signal is received.

The vehicle assembly 200 may be located at the lower end of the seat assembly 100. The vehicle assembly 200 may include the vehicle transmitter 210 configured to transmit wireless power to the seat assembly 100 and the vehicle controller 220 configured to control the vehicle transmitter 210.

The vehicle transmitter 210 may be configured as a pad type, a holder type, an access-point (AP) type, an embedded type, a wall-mounted type, etc., and one vehicle transmitter 210 may transmit power to a plurality of wireless power receiving apparatuses. For this purpose, the vehicle transmitter 210 may include at least one wireless power transmitter.

The wireless power transmitter may use various wireless power transfer standards based on the electromagnetic induction method which generates a magnetic field in a power transmission coil and induces electricity in the reception coil due to the magnetic field.

The vehicle controller 220 may be configured to control the vehicle transmitter 210. For example, the vehicle controller 220 may determine whether or not overvoltage occurs by comparing the measured intensity of the DC power output from the rectifier with a predetermined reference value. As a determination result, if overvoltage occurs, the vehicle controller 220 control the vehicle transmitter 210 so as to stop transmitting wireless power.

The front hook 310 may be located at the lower end of the front portion of the seat assembly 100 in the length direction, and serve to fix one end of the seat assembly 100 to the vehicle body. The front hook 310 may be configured to be coupled to a front hook engagement part 320 which is formed at one end of a floor panel of the vehicle body at a position corresponding to the front hook 310 so as to turn on the front hook switch 330.

The rear latch 410 may be located at the lower end of the rear portion of the seat assembly 100 in the length direction, and serve to fix the other end of the seat assembly 100 to the vehicle body. The rear latch 410 may be configured to be coupled to a rear latch engagement part 420 which is formed at the other end of the floor panel of the vehicle body at a position corresponding to the rear latch 410 so as to turn on rear latch switches 430.

The detachable seat wireless power transfer and communication system according to one embodiment of the present disclosure may include the front hook switch 330 located at the vehicle assembly 200 so as to correspond to the front hook 310.

The front hook switch 330 may be located at the front end of the vehicle assembly 200, and be configured to be turned on when a seat is mounted and one end of the front hook 310 contacts the front hook engagement part 320.

Figure 2A:
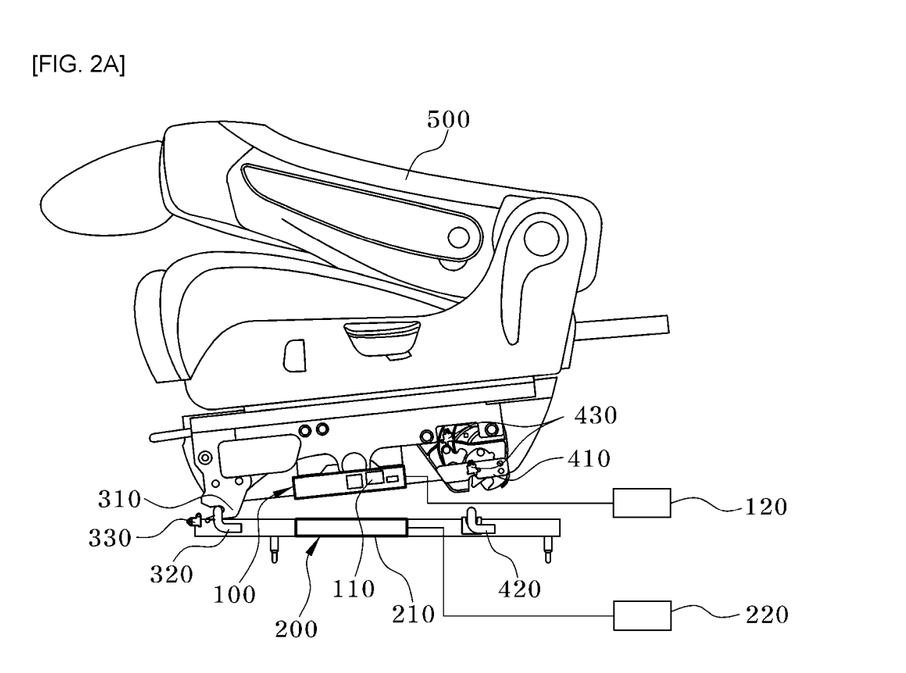
FIG. 2A is a view illustrating a detachable seat wireless power transfer and communication system according to one embodiment of the present disclosure in a state in which a front hook and a front hook switch contact each other.
Figure 2B:
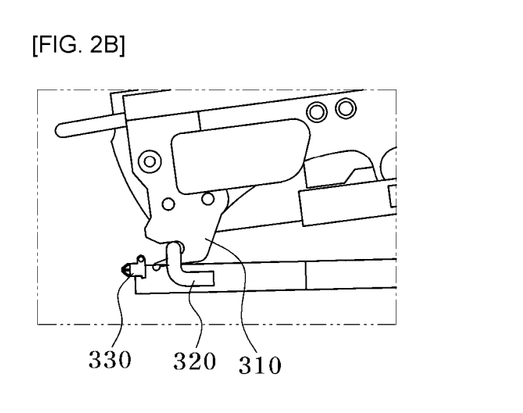
FIG. 2B is an enlarged view of FIG. 2A illustrating a front hook being coupled to a front hook engagement part according to one embodiment of the present disclosure
Figure 3:
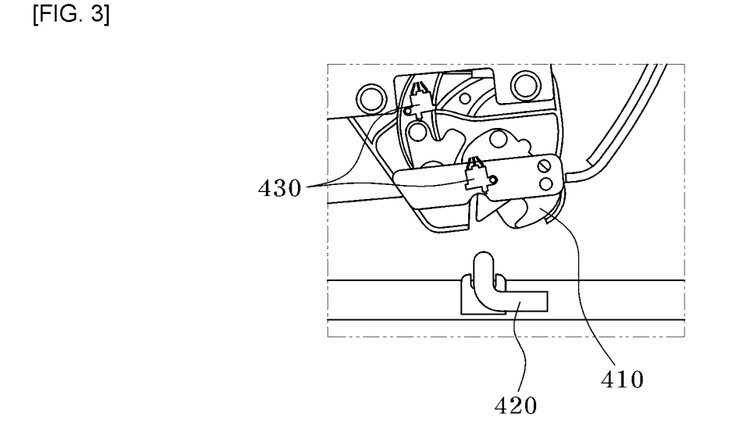
FIG. 3 is a view illustrating the detachable seat wireless power transfer and communication system according to one embodiment of the present disclosure in a state just before a rear latch contacts a rear latch engagement part.

FIGS. 2A and 2B are views illustrating the detachable seat wireless power transfer and communication system according to one embodiment of the present disclosure in a state in which the front hook and the front hook switch contact each other, and FIG. 3 is a view illustrating the detachable seat wireless power transfer and communication system according to one embodiment of the present disclosure in a state just before the rear latch contacts the rear latch engagement part.

Referring to FIGS. 2A, 2B and 3, the detachable seat wireless power transfer and communication system according to one embodiment of the present disclosure may be configured such that, when one end of the front hook 310 contacts the front hook switch 330, the seat controller 120 and the vehicle controller 220 mutually transmit and receive seat information and vehicle information with each other through wireless communication.

Here, the seat information may include a seat mounted state, whether or not a passenger sits on the seat, or whether or not the passenger fastens a safety belt. The vehicle information may include the starting state of the vehicle, that is, whether the vehicle has started or not, or a vehicle speed.

Before one end of the front hook 310 contacts the front hook switch 330, the vehicle controller 220 and the seat controller 120 may be in a standby state. More particularly, before one end of the front hook 310 contacts the front hook switch 330, the vehicle controller 220 and the seat controller 120 may be in a communication interruption state in which mutual communication therebetween is impossible.

The front hook engagement part 320 to which one end of the front hook 310 is coupled may be formed on the vehicle assembly 200. When the seat is mounted, one end of the front hook 310 may be engaged with the front hook engagement part 320, and when the end of the front hook 310 contacts the front hook switch 330, the front hook switch 330 may be turned on.

A sensor which senses whether or not the detachable seat is completely mounted may be applied to the front hook switch 330 which is a striker of the vehicle body. When one end of the front hook 310 contacts the front hook switch 330, the sensor may sense mounting of the seat.

When the front hook 310 is completely coupled to the front hook engagement part 320, the vehicle transmitter 210 may transmit low power to the seat receiver 110. Further, wireless communication between the vehicle controller 220 and the seat controller 120 may be activated.

More particularly, when one end of the front hook 310 contacts the front hook switch 330, the seat controller 120 and the vehicle controller 220 may mutually transmit and receive seat information and vehicle information with each other through wireless communication.

The vehicle controller 220 may transmit the vehicle information to the seat controller 120, and the seat controller 120 may transmit the seat information to the vehicle controller 220. More particularly, the seat controller 120 may provide the seat mounted state, whether or not a passenger sits on the seat, or whether or not the passenger fastens the safety belt, to the vehicle controller 220 through wireless communication. The vehicle controller 220 may provide the starting state of the vehicle or the vehicle speed to the seat controller 120 through wireless communication.

Wireless communication may use at least one communication network selected from the group consisting of Ethernet, Wireless Fidelity (Wi-Fi), Wireless Broadband (WiBro), World Interoperability for Microwave Access (WiMax), High Speed Downlink Packet Access (HSDPA), ZigBee, Bluetooth, Ultra-wideband (UWB), Infrared Data Association (IrDA), Shared Wireless Access Protocol (SWAP), Long Term Evolution (LTE), Cellular IoT, Low Power Wide Area (LPWA), NarrowBand-Internet of Things (IoT) and Long Range (LoRa).

In the state in which one end of the front hook 310 contacts the front hook switch 330, the rear latch 410 may not be engaged with the rear latch engagement part 420. Here, in the activated state of wireless communication, only low power may be transmitted as wireless power.

More particularly, in the state in which one end of the front hook 310 contacts the front hook switch 330 and the rear latch 410 is not engaged with the rear latch engagement part 420, the vehicle controller 220 and the seat controller 120 may mutually transmit and receive data through wireless communication. On the other hand, the vehicle controller 220 and the seat controller 120 may be in a wireless power reception standby state.

The wireless power reception standby state may mean a state in which the vehicle transmitter 210 applies low power to the seat receiver 110 but does not apply medium power to the seat receiver 110. The low power may mean wireless power of a strength incapable of operating an electronic unit 500 mounted on the seat. The medium power may mean wireless power of a strength sufficient to operate the electronic unit 500 mounted on the seat.

Figure 4:
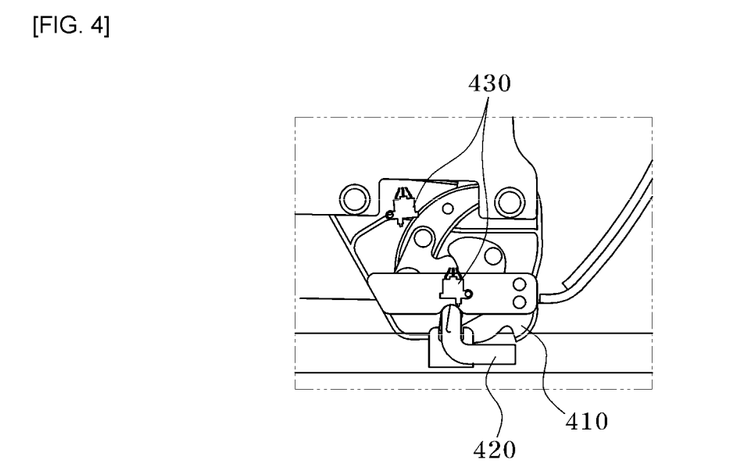
FIG. 4 is a view illustrating the detachable seat wireless power transfer and communication system according to one embodiment of the present disclosure in a state in which the rear latch contacts the rear latch engagement part.

FIG. 4 is a view illustrating the detachable seat wireless power transfer and communication system according to one embodiment of the present disclosure in a state in which the rear latch contacts the rear latch engagement part.

Referring to FIG. 4, the detachable seat wireless power transfer and communication system according to one embodiment of the present disclosure may further include the rear latch engagement part 420 located at the vehicle assembly 200 so as to correspond to the rear latch 410, and the rear latch switches 430 located inside the rear latch 410.

Further, when the rear latch 410 contacts the rear latch engagement part 420, the vehicle transmitter 210 may apply wireless power to the seat receiver 110.

More particularly, in the state in which one end of the front hook 310 contacts the front hook switch 330, the rear latch 410 may be coupled to the rear latch engagement part 420. Here, sensors provided on the vehicle body and the seat may sense that the front and rear ends of the seat assembly 100 are completely mounted on the vehicle body.

The rear latch engagement part 420 to which one end of the rear latch 410 is coupled may be formed on the vehicle assembly 200. The rear latch switches 430 may be formed in the rear latch 410. When the rear end of the seat is mounted on the vehicle body, one end of the rear latch 410 may be engaged with the rear latch engagement part 420, and the rear latch switches 430 may be turned on.

In the state in which one end of the front hook 310 contacts the front hook switch 330 and the rear latch 140 is not coupled to the rear latch engagement part 420, the vehicle transmitter 210 and the seat receiver 110 are in the wireless power reception standby state, and then when the rear latch 140 is coupled to the rear latch engagement part 420, the vehicle transmitter 210 and the seat receiver 110 may be converted into a state in which medium power may be wirelessly transmitted from the vehicle transmitter 210 to the seat receiver 110.

The vehicle transmitter 210 may apply wireless power to the seat receiver 110, and the wireless power may be supplied to the electronic unit 500 mounted on the seat. Here, as the wireless power, medium power having a strength sufficient to turn on power of the electronic unit 500 may be supplied.

The electronic unit 500 mounted on the seat may be a heater, a ventilation seat, a headrest, a lumbar support or a cushion extension. In the present disclosure, the electronic unit 500 is not limited thereto. When wireless power is supplied to the electronic unit 500, the electronic unit 500 may be operated simply by turning on the switch of the electronic unit 500 by a passenger.

The wireless power which the vehicle transmitter 210 applies to the seat receiver 110 may be applied based on the electromagnetic induction method or the electromagnetic resonance method.

If the wireless power is applied based on the electromagnetic induction method, the coil of the vehicle transmitter 210 and the coil of the seat receiver 110 are adjacent to each other, and when current is applied to the vehicle transmitter 210, magnetic flux may occur and thus induce electromotive force to the coil of the seat receiver 110, and thereby, power may be applied to the seat receiver 110.

In wireless power transfer, various power transfer standards based on the electromagnetic induction method, which perform charging using an electromagnetic induction principle in which a magnetic field is generated in the coil of the vehicle transmitter 210 and electricity is induced in the coil of the seat transmitter 110 due to the magnetic field, may be used. Here, the wireless power transfer standards based on the electromagnetic induction method may include electromagnetic induction-type wireless charging technologies which are defined by the Wireless Power Consortium (WPC) and/or the Power Matters Alliance (PMA).

In another embodiment, in wireless power transfer, the electromagnetic resonance method, in which power is transmitted to the seat receiver 110 located close to the vehicle transmitter 210 by tuning the magnetic field generated by the coil of the vehicle transmitter 210 to a specific resonant frequency, may be used. The electromagnetic resonance method may include resonance-type wireless charging technology which is defined by the Alliance for Wireless Power (A4WP).

In the detachable seat wireless power transfer and communication system according to one embodiment of the present disclosure, when a current value of the vehicle assembly 200 exceeds a predetermined reference value, the vehicle transmitter 210 may stop supplying wireless power, and when a voltage value of the seat assembly 100 is less than a predetermined reference value in the state in which the vehicle transmitter 210 applies wireless power so as to turn on the electronic unit 500, the seat controller 120 may transmit information to the vehicle controller 220 through wireless communication, and the vehicle transmitter 210 may stop supplying wireless power. Thereby, metallic foreign object damage (hereinafter, referred to as 'FOD') between the coils for wireless power transfer may be sensed. That is, power transfer may be controlled depending on a sensing result of the FOD state.

The vehicle assembly 200 may determine whether or not the current value exceeds the predetermined reference value. Here, the predetermined reference value may be a current value in a predetermined FOD situation. In the turned-off state of the electronic unit 500, the current value of the coil of the vehicle transmitter 210 may be measured. When the measured current value exceeds the predetermined reference value, the vehicle transmitter 210 may stop supplying wireless power.

The seat assembly 100 may determine whether or not the voltage value is less than the predetermined reference value in the turned-on state of the electronic unit 500. When the FOD situation occurs in the turned-on state of the electronic unit 500, the voltage value may be lowered, and when the voltage value is less than the predetermined reference value, the seat controller 120 may transmit information to the vehicle controller 220 through wireless communication. Here, the vehicle transmitter 210 may stop supplying wireless power.

Figure 5:
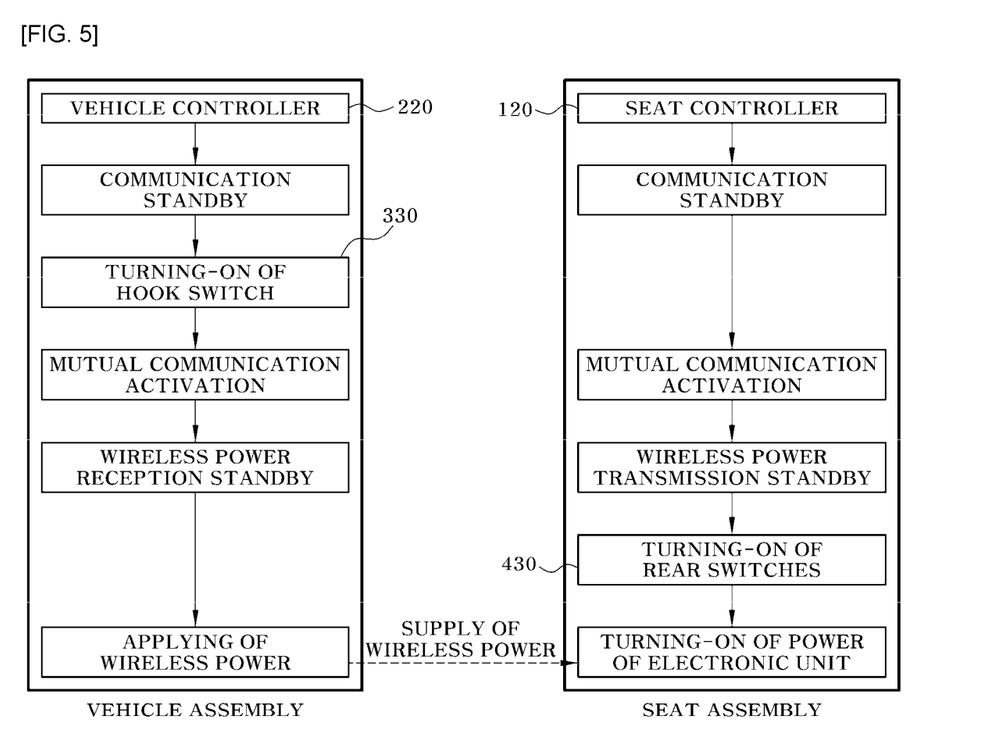
FIG. 5 is a block diagram of the detachable seat wireless power transfer and communication system according to one embodiment of the present disclosure.

FIG. 5 is a block diagram of the detachable seat wireless power transfer and communication system according to one embodiment of the present disclosure.

Referring to FIG. 5, the vehicle assembly 220 and the seat assembly 120 may control wireless communication and wireless power transfer depending on engagement stages of the seat assembly 100. More particularly, before one end of the front hook 310 contacts the front hook switch 330, the vehicle controller 220 and the seat controller 120 may be in a communication standby state. In the communication standby state, data may not be transmitted and received between the vehicle and the seat.

When one end of the front hook 310 contacts the front hook switch 330, wireless communication between the vehicle controller 220 and the seat controller 120 may be activated. Furthermore, the vehicle transmitter 210 may be in a wireless power transmission standby state, and the seat receiver 110 may be in a wireless power reception standby state. In the wireless power transmission standby state and the wireless power reception standby state, the vehicle transmitter 210 may not supply medium power sufficient to turn on the electronic unit 500 of the seat.

Sequentially, when the rear latch 410 contacts the rear latch engagement part 420, the vehicle transmitter 210 may apply wireless power to the seat receiver 110. The seat receiver 110, having received wireless power, may supply power to the electronic unit 500 mounted on the seat. Here, a passenger may adjust operation of the electronic unit 500 by operating the switch of the electronic unit 500.

In summary, the present disclosure provides the detachable seat wireless power transfer and communication system in which the seat controller 120 is provided on the detachable seat separately from the vehicle controller 220 so as to perform wireless communication therebetween, and the vehicle transmitter and the seat receiver are provided in addition to the detachable seat so as to perform wireless power transfer without connectors, thereby being capable of solving problems, such as twisting of wires during movement of the seat, and improving convenience in use and marketability of the interior of the vehicle.

As is apparent from the above description, a detachable seat wireless power transfer and communication system according to the present disclosure may have the following effects through the above-described configuration and connection and usage relations.

In the detachable seat wireless power transfer and communication system, a seat controller is provided in a detachable seat separately from a controller of a vehicle so as to perform wireless communication therebetween, and thus, the function of an electronic unit may be implemented simply by mounting the detachable seat in the vehicle without a separate connecting operation.

Further, the detachable seat is applied and a vehicle transmitter and a seat receiver are provided so as to perform wireless power transfer without connectors, and thus, problems, such as twisting of wires during movement of the seat, i.e., a long slide seat or a swivel seat, may be solved, and convenience in use and marketability of the interior of the vehicle may be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A detachable seat wireless power transfer and communication system comprising:
    a seat assembly comprising:
        a seat receiver configured to receive power wirelessly; and
        a seat controller configured to control the seat receiver;
        a front hook located at a lower end of a front portion of the seat assembly in a length direction, the front hook configured to fix a first end of the seat assembly to a vehicle body; and
        a rear latch located at a lower end of a rear portion of the seat assembly in the length direction, the rear latch configured to fix a second end of the seat assembly to the vehicle body;
    a vehicle assembly spaced apart from the seat assembly at a lower end of the seat assembly; the vehicle assembly comprising:
        a front hook switch positioned to correspond to the front hook,
        a vehicle transmitter configured to wirelessly transmit the power to the seat assembly; and
        a vehicle controller configured to control the vehicle transmitter,
    wherein, when a first end of the front hook contacts the front hook switch, the seat controller and the vehicle controller mutually transmit and receive seat information and vehicle information with each other through wireless communication.

2. The system of claim 1, wherein the seat information includes at least one of a seat mounted state, whether or not a passenger sits on a seat, or whether or not the passenger fastens a safety belt, and
    wherein the vehicle information includes at least one of whether a vehicle has started or not or a vehicle speed.

3. The system of claim 1, further comprising:
    a rear latch engagement part connected to the vehicle assembly and disposed to correspond to the rear latch; and
    rear latch switches disposed inside the rear latch.

4. The system of claim 3, wherein, when the rear latch contacts the rear latch engagement part, the vehicle transmitter is configured to supply the power to the seat receiver.

5. The system of claim 4, wherein:
    when a current value of the vehicle assembly exceeds a predetermined reference value, the vehicle transmitter is configured to stop supplying the power wirelessly; and
    when a voltage value of the seat assembly is less than a predetermined reference value in a state in which the vehicle transmitter supplies the power wirelessly to turn on an electronic unit, the seat controller is configured to transmit information to the vehicle controller through wireless communication and the vehicle transmitter is configured to stop supplying the power.

6. The system of claim 4, wherein the power is supplied wirelessly to the electronic unit mounted on a seat.

7. The system of claim 6, wherein the electronic unit comprises at least one selected from the group consisting of a heater, a ventilation seat, a headrest, a lumbar support and a cushion extension.

8. The system of claim 4, wherein the power is wirelessly supplied based on an electromagnetic induction method or an electromagnetic resonance method.

9. The system of claim 1, wherein the wireless communication uses at least one communication network selected from the group consisting of Ethernet, Wireless Fidelity (Wi-Fi), Wireless Broadband (WiBro), World Interoperability for Microwave Access (WiMax), High Speed Downlink Packet Access (HSDPA), ZigBee, Bluetooth, Ultra-wideband (UWB), Infrared Data Association (IrDA), Shared Wireless Access Protocol (SWAP), Long Term Evolution (LTE), Cellular IoT, Low Power Wide Area (LPWA), NarrowBand-Internet of Things (IoT) and Long Range (LoRa).

\* \* \* \* \*